(12) United States Patent
Yao

(10) Patent No.: US 8,021,520 B2
(45) Date of Patent: Sep. 20, 2011

(54) METHOD AND DEVICE FOR PREPARING LIQUID

(75) Inventor: Linlin Yao, Shenzhen (CN)

(73) Assignee: Shenzhen Zofu Technology Co., Ltd, Shenzhen, Guangdong (CN)

( * ) Notice: Subject to any disclaimer, the term of this patent is extended or adjusted under 35 U.S.C. 154(b) by 0 days.

(21) Appl. No.: 12/825,256

(22) Filed: Jun. 28, 2010

(65) Prior Publication Data

US 2010/0264011 A1    Oct. 21, 2010

Related U.S. Application Data

(62) Division of application No. 10/541,186, filed as application No. PCT/CN03/01086 on Dec. 18, 2003, now Pat. No. 7,770,511.

(30) Foreign Application Priority Data

Jan. 6, 2003    (CN) .................................. 03 1 13538

(51) Int. Cl.
*B01D 3/00*    (2006.01)
*B01D 5/00*    (2006.01)
*C12G 3/12*    (2006.01)
*B01D 11/02*    (2006.01)

(52) U.S. Cl. ................. 203/42; 203/43; 203/96; 203/97; 210/634; 210/664; 210/805; 426/492; 432/4; 432/14

(58) Field of Classification Search .................. 203/1–2, 203/42–43, 95–97; 210/634, 664, 805; 432/4, 432/13–14; 426/492
See application file for complete search history.

(56) References Cited

U.S. PATENT DOCUMENTS

| | | | |
|---|---|---|---|
| 541,410 A * | 6/1895 | Albach | 202/169 |
| 3,774,008 A | 11/1973 | Maniscalco | |
| 4,717,532 A | 1/1988 | Schwab | |
| 4,751,941 A | 6/1988 | Van Zijverden | |
| 5,542,021 A | 7/1996 | Hopper et al. | |
| 5,572,923 A * | 11/1996 | Kuboyama | 99/287 |
| 5,776,319 A * | 7/1998 | Mar | 203/1 |
| 6,175,100 B1 * | 1/2001 | Creamer et al. | 219/401 |
| 6,380,522 B1 | 4/2002 | Bochud | |
| 6,453,802 B1 | 9/2002 | Manganiello et al. | |

FOREIGN PATENT DOCUMENTS

CN    88105700 A    12/1988
(Continued)

*Primary Examiner* — Virginia Manoharan
(74) *Attorney, Agent, or Firm* — Knobbe Martens Olson & Bear LLP

(57) ABSTRACT

The invention relates to a device and method for preparing liquid from solid materials such as medicinal materials. It includes liquid and materials for preparing the liquid at the beginning and the end of the process. The device uses a steam generator, an intermediate switch valve and a material chamber, which are connected sequentially with pipes, and further includes an outlet pipe, which is at the bottom of the material chamber. The method involves the steps of: distillation and absorption; immersion; and repetition. The device and method for preparing liquid alternates the distillation and immersion steps, which reduces harmful substance in the prepared liquid that would otherwise occur by conventional methods. The method not only extracts soluble effective matter, but also reduces loss of volatile effective matter. Ultimately, the method makes the steps for preparing liquid simple and clear, and it can prepare liquid quantitatively, effectively and without pasty and shrinkable characteristics. The device may be automatically controlled by an electric control circuit, thereby avoiding operational errors that are common with manually operated, conventional devices.

11 Claims, 2 Drawing Sheets

FOREIGN PATENT DOCUMENTS

| | | |
|---|---|---|
| CN | 1101940 A | 4/1995 |
| CN | 1148976 A | 5/1997 |
| CN | 1223139 A | 7/1999 |
| CN | 1439298 A | 9/2003 |
| JP | 1997-151176 A | 6/1997 |
| JP | 1998-218796 A | 6/2003 |

* cited by examiner

METHOD AND DEVICE FOR PREPARING LIQUID

CROSS-REFERENCE TO RELATED APPLICATIONS

This application is a divisional of Application No. 10/541,186, filed Aug. 10, 2006, now issued as U.S. Pat. No. 7,770,511, which is the United States National Phase under 35 U.S.C. §371 of International Application PCT/CN2003/001086, filed Dec. 18, 2003, which claims priority to Chinese Application No. CN 03113538.2, filed Jan. 6, 2003, all of which are herein incorporated by reference in their entireties.

BACKGROUND OF THE INVENTION

1. Field of the Invention

The present invention relates to a technology for extracting effective substances from solid materials to prepare liquid and more in particular to a device and method to replace the traditional "boiling" method for preparing liquid.

2. Description of the Related Art

People usually extract effective substances from solid materials to prepare liquid, such as boiling medicinal materials and cooking soup. A conventional method for preparing liquid mainly uses a "boiling" method; i.e., put raw materials into water, heat the water so that the effective substances in the materials are released under the function of high temperature and dissolved into the water that becomes a liquid containing effective substances of the materials. This method is relatively quite complicated. In order to fully extract the effective substances in the materials, people usually carry out a control, in view of actual situations, of quantity of added water, boiling time, quantity of remained water and fire power. These operations are difficult to carry out successfully without rich experience. For each type of materials, these operations need to be adjusted according to differences of environment and actual situations. Even though an experienced person keeps monitoring these operations, the prepared liquid may become concentrated and the materials burnt to be unusable due to his accidentally careless behavior. Thus, automatic control for these operations is difficult to achieve. Meanwhile, the originally added water may gradually evaporate in the process of boiling and the non-volatile harmful substances will be accumulated in the prepared liquid which is harmful to human bodies if the liquid is used for drinking. In addition, the volatile effective substances may be volatilized into the air in the process of boiling, which causes amount decrease and waste of effective substances.

SUMMARY OF THE INVENTION

An object of the present invention is to provide a method for preparing a liquid to reduce the harmful substances in the prepared liquid, to increase amount of volatile effective substances, and further to simplify and automate the process of liquid preparation to avoid causing prepared liquid unusable.

The method includes the steps of preparing liquid and materials for preparing liquid at the beginning and obtaining prepared liquid at the end, and further includes the following featured steps of:

(1.1) Distillation and Absorption:. [0006] The distillation refers to heating materials in a sealed space with an outlet at the bottom thereof by providing high temperature steam to the sealed space so that the materials can release volatile substances and soluble substances. The absorption refers to the absorption of the volatile substances by the high temperature steam which is pressed out of the outlet;

(1.2) Immersion: [0008] The immersion refers to dissolving the soluble substances in step (1.1) in the liquid which is pressed into the sealed space through the outlet or a defined inlet by the air pressure created when stopping delivering the high temperature steam to the sealed space to allow the steam with high temperature in the sealed space to cool down to water so that the sealed space air pressure becomes negative with respect to the outside of the sealed space.

(1.3) Repetition: [0010] The repetition refers to providing high temperature steam to the sealed space to increase the air pressure therein so as to press the liquid out of the sealed space through the outlet. Redo step (1.2) and step (1.3) according to specified requirements.

In accordance with a feature of the method in this invention, the liquid is water or water solution dissolving said volatile substances and soluble substances, and the sealed space includes an intermediate material layer with variable thickness for liquid preparation, a hollow upper layer, a lower layer and a web plate to separate the intermediate material layer from the lower layer.

In accordance with another feature of the method in this invention, high temperature steam with certain pressure in step (1.1) is introduced into the upper layer of the sealed space, goes through the pore spaces of materials in the intermediate material layer, distills the materials, enters into the lower layer together with the volatile substances, and is forced out through the outlet.

In accordance with another feature of the method in this invention, the period of time for a distillation and absorption may be set for 0.3 to 10 minutes and the period of time for a immersion may be set for 0.3 to 8 minutes.

In accordance with another feature of the method in this invention, the specified requirements in step (1.3) refers to ending step (1.3) when a repeating times is more than the predetermined times which is equal to or more than twice, otherwise redoing step (1.1) and step (1.2).

In accordance with another feature of the method in this invention, the specified requirement in step (1.3) refers to ending step (1.3) when the materials for liquid preparation is found to primarily finish releasing the volatile and soluble substances and when the volatile and soluble substances are dissolved and absorbed by the liquid, otherwise redoing step (1.1) and step (1.2).

In accordance with a feature of the device in the invention, the device includes a steam generator 2, an intermediate switch valve 6, a materials chamber 8, which are connected sequentially with pipes, and further includes an outlet pipe 10 at the bottom of the material chamber and a liquid container 11 into which the outlet pipe extends. Steam generator 2 for producing high temperature steam includes a housing 17, a heater 1 inside the housing, a water level controller 3 at the upper portion of the housing, a sealing cap (4) on water fill inlet at the top and a pressure valve 5 at the top. Materials chamber 8 for holding the materials for liquid preparation includes a top sealing cap 7, an outlet pipe 10 at the bottom thereof and a separation web plate 16. Liquid container 11 is used to hold water 12 to dissolve and absorb the volatile substances and soluble substances. The intermediate switch valve 6 controls entry of the high temperature steam into materials chamber 8.

In accordance with another feature of the device in the invention, the device also includes a bypass return pipe 13 wherein one end thereof is connected to outlet pipe 10 and the other end thereof is connected to the upper portion of material chamber 8, a one-way valve 15 connected between outlet pipe 10 and material chamber 8, and a one-way valve 14 connected between bypass return pipe 13 and material chamber 8.

In accordance with another feature of the device in the invention, the steam generator 2 shown in FIG. 1 further includes a water intake device, shown schematically as (WID) 18, a water intake switch, shown schematically as (WIS) 19, water level controller 3, intermediate switch valve 6, heater 1 and an electric circuit, shown schematically as (EC) 20 for testing and automatically controlling water intake.

The object of the device and the method for liquid preparation in this invention is to reduce harmful substances in the liquid prepared in the traditional methods, to fully extract soluble effective substances, and to decrease the loss of volatile effective substances. It is a further objective of this invention to simplify and specify the methods of liquid preparation to allow the liquid preparation to be quantified, not pasty and concentrated, and with high efficiency. Meanwhile it uses the electric testing and controlling circuit to perform automation control which overcomes the disadvantages of the boiling methods.

DETAILED DESCRIPTION OF THE PREFERRED EMBODIMENT

The method for preparing liquid provided by this invention, most importantly, includes a process of distilling the liquid preparation materials to release effective substances thereof and meanwhile collecting the volatile substances therein, and a process of collecting the soluble substances therein. These processes are repeated. This method can be achieved by utilizing the following devices under the air pressure theory. Together with the figures and embodiments, the method of this invention is further described.

Figure 1:
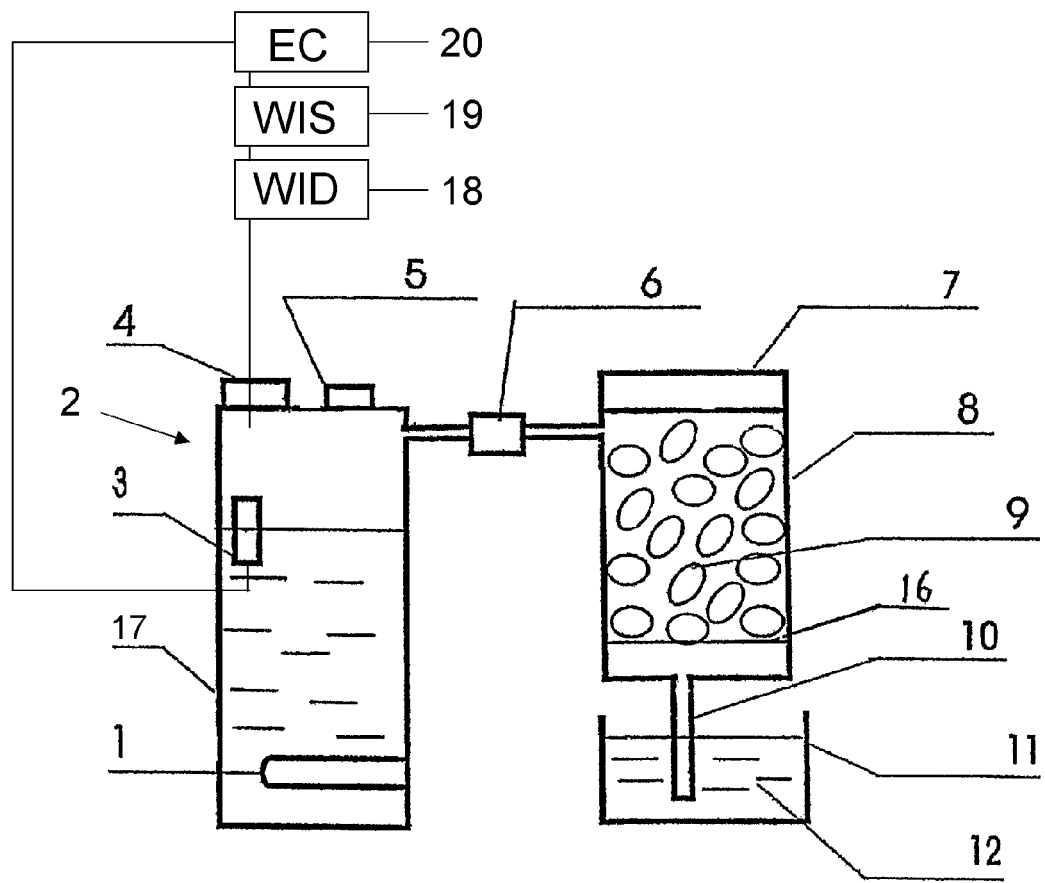
FIG. 1 is a structure diagram of a standard liquid preparation device provided by this invention.

First, the device for this invention is described as follows:

This device can be a standard liquid preparation device as shown in FIG. 1 including steam generator 2, materials chamber 8 connected to the steam generator through pipes, intermediate switch valve 6 between steam generator 2 and materials chamber 8, liquid container 11 placed below materials chamber 8, and outlet pipe 10 at the bottom of materials chamber 8 extending into the water solution in liquid container 11. Steam generator 2 includes the heater 1 on the inside lower portion thereof, water level controller 3 on the upper portion of the housing, and sealing cap 4 and pressure valve 5 at the top thereof. Material chamber 8 includes top sealing cap 7, outlet pipe 10 at the bottom thereof and separation web plate 16. One end of the pipe opens at the upper portion of steam generator 2 and the other end opens at the upper portion of materials chamber 8.

Figure 2:
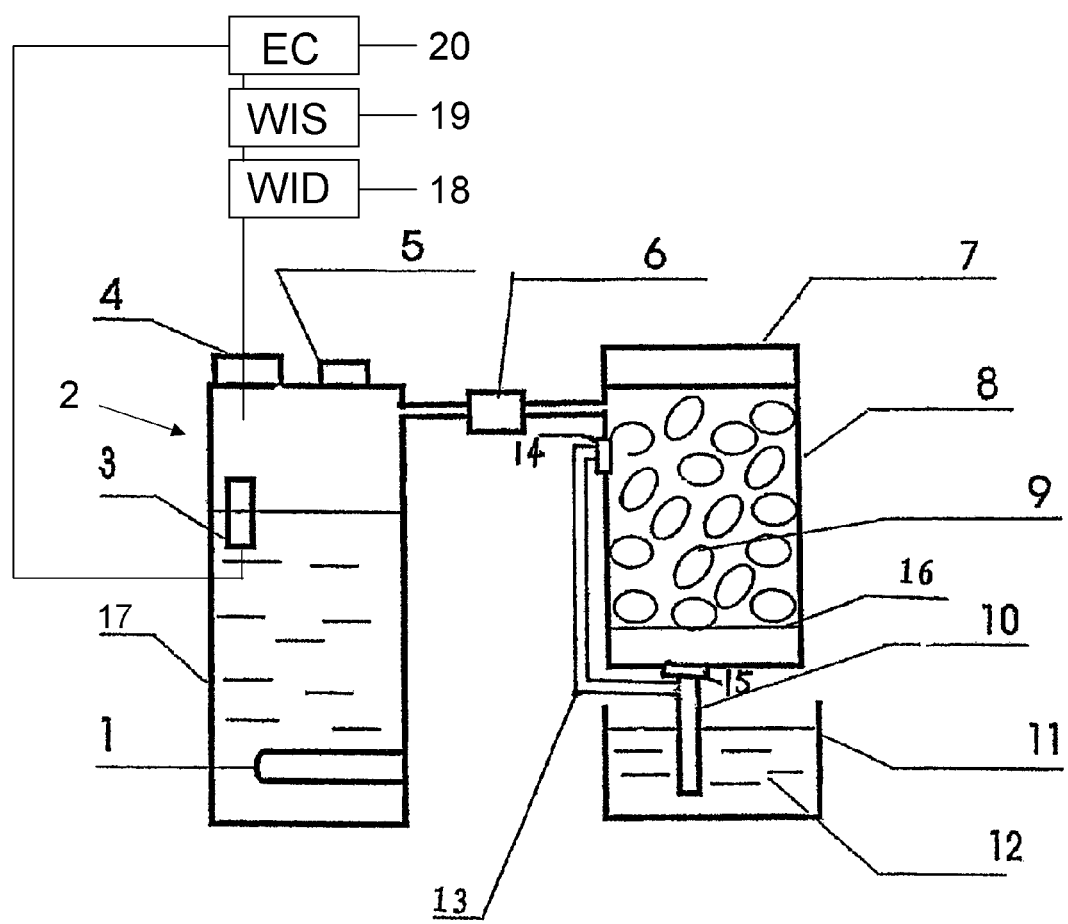
FIG. 2 is a structure diagram of a liquid preparation device with bypass liquid return pipe provided by this invention.

This device can also be a liquid preparation device with a bypass return pipe as shown in FIG. 2. Bypass return pipe 13 has one end opening on outlet pipe 10 at the bottom of materials chamber 8 and the other end opening on the upper portion of materials chamber 8. A one-way valve 15 through which steam is pressed out is placed between outlet pipe 10 and material chamber 8. A one-way valve 14 through which liquid is pressed in is placed between bypass return pipe 13 and material chamber 8. Liquid container 11 generally refers to containers holding liquid, including glasses, basins, jars, buckets, pots, and some special containers.

Furthermore, the liquid preparation process for using this device is described as follows:

a) Work Flow:

As the water in steam generator 2 is heated to boiling to produce high temperature steam, intermediate switch valve 6 is opened to allow steam to enter into material chamber 8; With the propulsion of the steam produced afterwards, the steam goes down, distills the liquid preparation materials, and absorbs the effective substances; The steam containing the effective substances enters into outlet pipe 10 through which it is guided into liquid container 11 where the steam dissolved into the water therein to become water solution 12; After intermediate valve 6 is closed (also the steam generator can stop operation at the same time), the steam in the material chamber 8 cools down to cause negative pressure in the materials chamber. Under the air pressure, water solution 12 in liquid container 11 is pressed into material chamber 8 to immerse the materials; After intermediate switch valve 6 is opened again (steam generator 2 may be started at the same time), the steam is allowed to enter into material chamber 8 again. Since the steam pressure becomes greater than the outside air pressure, the water solution in which the materials have been immersed is pressed back from material chamber 8 into liquid container 11; then, the steam enters into the solution to create a cycle. This cycle runs repeatedly until an appropriate effect is achieved.

b) Detailed Procedures (Taking Standard Liquid Preparation Device as an Example):

Before use: fill in steam generator 2 with water, mount and screw tightly sealing cap (4), put the liquid preparation materials in material chamber 8, mount and screw tightly sealing cap 7, and then fill in liquid container 11 with a certain amount of water enough to allow the portion thereof higher than the bottom end of outlet pipe 10 to submerge liquid preparation materials 9 and to open intermediate switch valve 6.

During use: heater 1 in steam generator 2 is supplied with power to heat water to boiling to generate steam; The steam enters into material chamber 8 through pipes and intermediate switch valve 6 and distills liquid preparation materials 9 to make liquid preparation materials 9 to release the effective substances in which the volatile effective substances mixes with the steam to form medicine steam; The medicine steam is guided into water solution 12 in liquid container 11 through outlet pipe 10; After a period of time passed, intermediate switch valve 6 is closed and meanwhile heater 2 can also be close to allow the steam in material chamber 8 to cool down to water, which cause a negative pressure in material chamber 8; under the air pressure, the water solution in liquid container 11 is pressed into material chamber 8 to immerse the materials in material chamber 8 and to dissolve soluble effective substances released from the material. After a certain period of immersion, intermediate switch valve 6 is opened again and heater 1 is supplied with power at the same time to have the steam once again to enter into material chamber 8; under the steam pressure, the solution with effective substances in material chamber 8 is pressed back into liquid container 11 through outlet pipe 10; and then the distillation is repeated; After several repetitive operations of closing and opening of intermediate switch valve 6, the effective substances in liquid preparation materials 9 are fully released in the required water solution.

After use: when the water solution in material chamber 8 is fully pressed out in the process of distillation, first turn off the power of heater 1 to stop heating then close intermediate switch valve 6 and then take out the prepared liquid; The steam in steam generator 2 cools down to allow pressure valve 5 to automatically open under the negative pressure to have air in it so as to balance the air pressure between inside and outside of steam generator 2 and material chamber 8 to complete the whole workflow processes.

Further, separation web plate 16 in material chamber 8 can prevent the liquid preparation materials from blocking the outlet pipe and allow the steam and volatile substances to be pressed out of the outlet easily water level controller 3 is used to make sure that the water in steam generator 1 is enough to submerge heater 2 for safety if there is an accidental path blockage causing the air pressure in steam generator 2 to increase, pressure valve 5 will automatically open to release pressure to avoid accidents intermediate switch 6, water level controller 3 and heater 1 can be tested and controlled electrically. Moreover, in this invention, based on different materials, amount of materials and different purposes, the time of distillation varies widely from 0.3 to 10 minutes every distillation and that of immersion varies widely from 0.3 to 10 minutes every immersion and the process must be repeated at least twice. According to actual situations, we can preset the time of distillation and immersion and the repeat times and add electrically controlled water intake device and water intake switch to steam generator 2 to automatically test the water level of water level controller 3. When water is less, the water intake switch is opened automatically by an electric control circuit to allow water to enter into steam generator 2. At the beginning of distillation, the electric control circuit automatically opens intermediate switch valve 6 and supply powers to heater 2 at the same time (steam generator 2 starts to generate steam). After the distillation ends, the electric control circuit automatically closes intermediate switch valve and turn off the power of heater 1 (steam generator 2 stops to generate steam) to start immersion process. The electric control circuit repeats the above-mentioned process to automate the liquid preparation process only by putting in materials and filling water in liquid container 11. The materials and water are prepared according to amount.

The invention is further illustrated by means of the following examples, which represent preferred embodiments in various fields:

a. New Type Chinese Traditional Medicine Machine

The device of the invention can be used as a Chinese medicine machine for preparing Chinese medicinal liquid with high effectiveness (because of containing more volatile effective substance) and more favorable to human body because the invention requires no boiling to prevent the water from concentration and also can be basically quantified to avoid wasting materials, burning medicines and drying pot. The Chinese medicine machine can also use process control technologies at the same time, which is convenient for operation and allows a person without any experience to prepare Chinese medicinal liquid with good quality.

b. New Type Medicated Bath Machine

The device of the invention can also be used as a medicated bath machine to prepare liquid from medicinal materials, which is prepared into bath liquid together with other ingredients or is delivered to a bathtub. To deliver medicine liquid for various of medicated baths, the liquid container can be used as the container for bathing and the outlet pipe can be used as conduit put into the container for bathing.

c. Various Kinds of New Type Automatic Soup Cookers

The device of this invention can be used as an automatic soup cooker when the liquid container is used for holding soup with nutritious substance extracted from solid foodstuff such as poultry.

d. New Type Equipments for Production of Various Kinds of Beverages.

The device of this invention can be used to extract liquid from solid foodstuffs such as fresh fruits, dried fruits, subsidiary foodstuff, and medicinal materials for preparing the high-effectiveness and convenient beverage.

What is claimed is:

1. A method for preparing a liquid comprising volatile and soluble substances from a material that releases said volatile and soluble substances, wherein the method comprises:
   (a) heating said material in a sealed chamber with steam having a temperature sufficiently high to release the volatile and soluble substances from said material;
   (b) stopping delivery of the steam to the sealed chamber so as to allow the steam in the sealed chamber to cool down and condense to liquid water so that a negative air pressure differential is created in the sealed chamber with respect to outside of the sealed chamber;
   (c) pressing a liquid from a container into the sealed chamber due to the negative air pressure difference formed in (b);
   (d) dissolving the volatile and soluble substances released by (a) into the liquid pressed into the sealed chamber in (c);
   (e) supplying steam to the sealed chamber to recover the air pressure therein so as to force the liquid out of the sealed chamber through an outlet and into the container; and
   (f) repeating (b) through (e) at least one time;
wherein a liquid comprising volatile and soluble substances from the material is recovered.

2. A method according to claim 1, wherein (c) comprises transporting liquid from the container through a bypass liquid return pipe to the sealed chamber.

3. A method according to claim 2, wherein (c) comprises returning the liquid to the sealed chamber through a one-way valve.

4. A method according to claim 1, wherein a steam generator supplies steam for (a) and (e).

5. A method according to claim 4, wherein a water intake switch (WIS) is activated to allow water to enter the steam generator through a water intake device (WID).

6. A method according to claim 5, wherein an electric circuit (EC) tests and controls the method.

7. A method according to claim 1, wherein said liquid is water or an aqueous solution in which said volatile substances and soluble substances dissolve.

8. A method according to claim 7, and said sealed chamber comprises an intermediate material layer with a variable thickness for the material, a hollow upper layer, a hollow lower layer and a separation web plate to isolate the intermediate material layer from the lower layer.

9. A method according to claim 8, wherein the steam in (a) is forced into the upper portion of the sealed chamber, goes through pores of the material in the intermediate material layer, distills the material, enters into a lower portion together with the volatile substances, and then is forced out through the outlet.

10. A method according to claim 1, wherein a period of time for (a) is set for 0.3 to 10 minutes and a period of time for (b) is set for 0.3 to 8 minutes.

11. A method according to claim 1, wherein steps (b) through (e) are repeated two or more times.

* * * * *